(12) United States Patent
Wang et al.

(10) Patent No.: US 7,187,096 B2
(45) Date of Patent: Mar. 6, 2007

(54) MULTI-LAYER COMPOSITE RINGS FOR MACHINE ROTORS

(75) Inventors: Yu Wang, Clifton Park, NY (US);
Christopher Anthony Kaminski, Schenectady, NY (US); Erwin W. Liang, Ballston Lake, NY (US); Ronald Ralph Cairo, Greer, SC (US); Wendy Wen-Ling Lin, Niskayuna, NY (US); Andrew Jay Salem, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 10/678,158

(22) Filed: Oct. 6, 2003

(65) Prior Publication Data

US 2005/0073215 A1 Apr. 7, 2005

(51) Int. Cl.
*H02K 5/10* (2006.01)
(52) U.S. Cl. .......................................... 310/85; 310/261
(58) Field of Classification Search .................. 310/85, 310/214, 261, 262, 270
See application file for complete search history.

(56) References Cited

U.S. PATENT DOCUMENTS

| 3,755,059 | A  | * | 8/1973  | Calfee ........................ 428/182 |
| 4,278,905 | A  |   | 7/1981  | Chari et al. |
| 5,111,356 | A  | * | 5/1992  | Hardy ...................... 361/321.2 |
| 5,191,164 | A  |   | 3/1993  | Hawke et al. |
| 6,169,353 | B1 | * | 1/2001  | Driscoll et al. ............. 310/261 |
| 6,239,527 | B1 |   | 5/2001  | Kaminski et al. |
| 6,291,919 | B1 |   | 9/2001  | Ganti et al. |
| 6,495,942 | B1 |   | 12/2002 | Kaminski et al. |
| 6,509,664 | B2 | * | 1/2003  | Shah et al. .................. 310/181 |
| 6,703,733 | B1 | * | 3/2004  | Wang et al. ................... 310/85 |
| 6,885,120 | B2 | * | 4/2005  | Kaminski et al. ............. 310/85 |

* cited by examiner

*Primary Examiner*—Darren Schuberg
*Assistant Examiner*—Nguyen N Hanh
(74) *Attorney, Agent, or Firm*—Nixon & Vanderhye P.C.

(57) ABSTRACT

An enclosure for a rotor in a generator including the rotor, rotor windings and a stator, the enclosure comprising a plurality of composite rings located adjacent one another along a length dimension of the rotor so as to contain the rotor windings on the rotor, the rings each comprising at least two layers selected from the group consisting essentially of metals, glass fiber laminates and graphite fiber laminates.

16 Claims, 4 Drawing Sheets

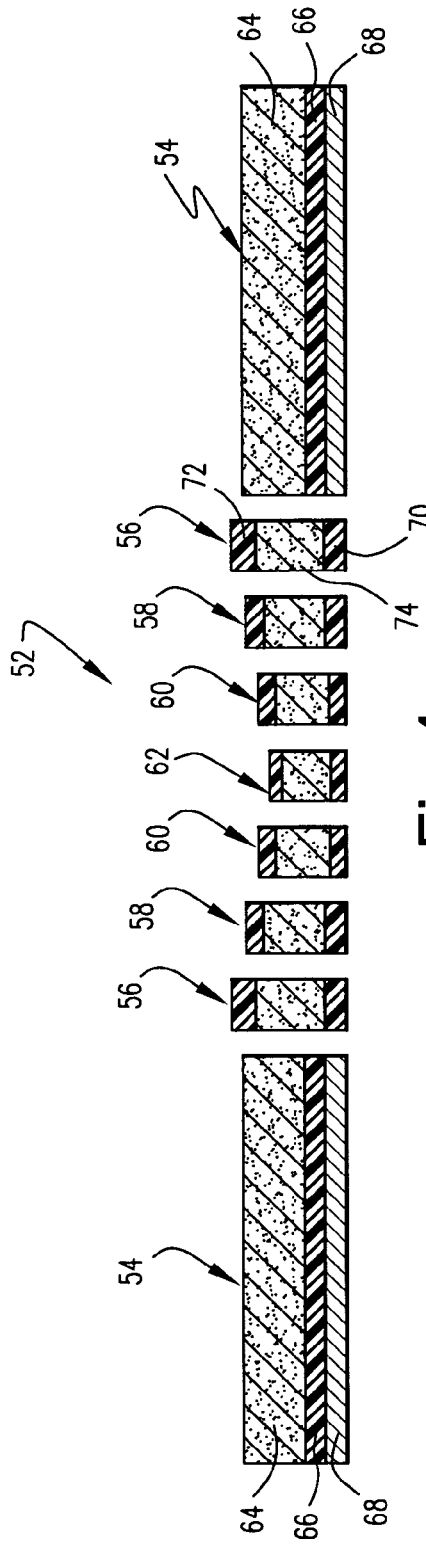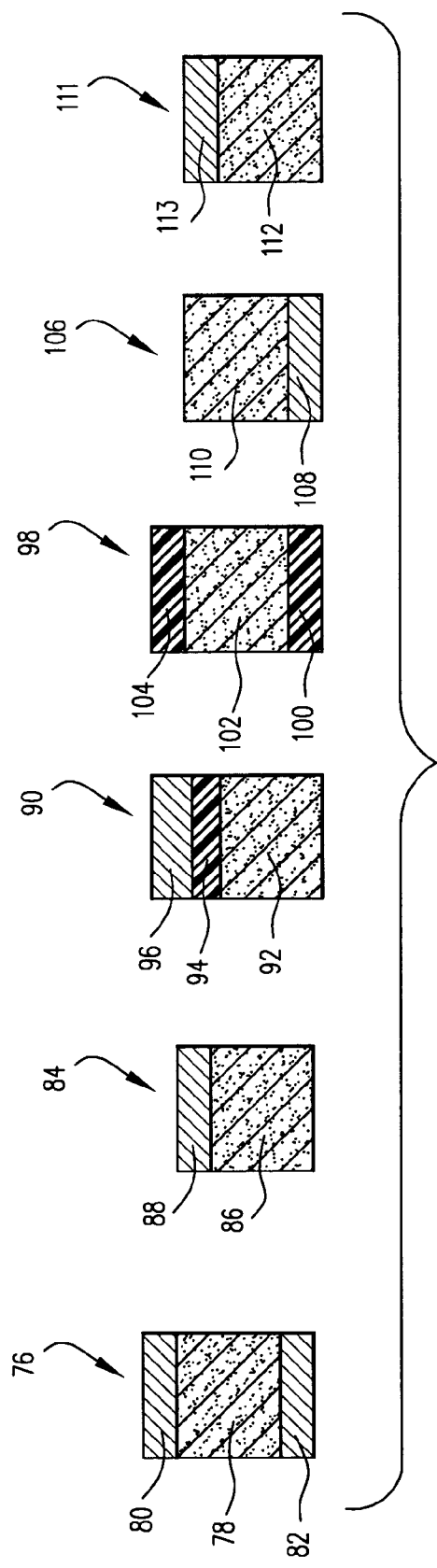

MULTI-LAYER COMPOSITE RINGS FOR MACHINE ROTORS

BACKGROUND OF THE INVENTION

The present invention relates to generators and, more particularly, to an enclosure for a generator rotor.

In a conventional generator having a rotor and a stator, the rotor is provided with field windings that excite the generator while receiving a current from an exciting current source. The stator is provided with armature windings from which electrical power is output. Typical rotor construction requires that a field winding be assembled, bar by bar, into radial slots milled into a rotor forging. Containment of the rotor field windings is typically achieved using rotor wedges, rotor teeth and retaining rings.

In commonly owned U.S. Pat. No. 6,239,527, an enclosure for a rotor in a generator is described that is constructed of a non-magnetic, and preferably filament wound tube. The '527 patent discloses that the enclosure may be formed as a continuous tube or as a plurality of rings, preferably slightly oval in shape.

In commonly owned U.S. Pat. No. 6,291,919, a metal enclosure shield is disposed between the non-magnetic enclosure and the winding assemblies on the rotor. The enclosure shield is constructed of an electrically conductive material such as aluminum and is designed to provide adequate electromagnetic shielding for the rotor field winding, with good electrical contact with the magnetic core poles, while also providing axial stiffness to the winding structure. However, the insertion of a metallic shield radially between the composite enclosure and the field winding as described in the '919 patent is not a satisfactory solution in light of, for example, structural and manufacturing issues relating to stress concentration.

In commonly owned U.S. Pat. No. 6,495,942, the rotor enclosure is preferably constructed from a low density composite material such as a carbon fiber-glass fiber composite material.

Graphite epoxy based composite laminates have significant specific strength (strength-to-density ratio) compared to metallic material. However, graphite laminates have low interlaminar shear strength and the inplane tensile strength of the composite is very sensitive to surface damage that severs fibers. Thus, the use of graphite laminates as structural components in a rotating stress field (such as a rotor structural enclosure) is technologically problematic.

Moreover, when graphite (carbon fiber) composite interfaces with a conductive metallic component, such as an aluminum alloy, Galvanic interaction and resulting corrosion is likely to occur.

BRIEF DESCRIPTION OF THE INVENTION

In an exemplary embodiment of this invention, the structural rotor enclosure, preferably in a multiple ring configuration, is constructed as a layered composite. Generally, the rings are comprised of two, three or more (as many as five) layers selected from graphite (carbon) fiber laminates, metallic layers and glass fiber layers. In the detailed description section hereinbelow, various combinations of layers are described that are within the scope of the invention.

The length and arrangement of enclosure rings for particular applications may vary. For example, a plurality of relatively short rings may be located between a pair of longer rings or tube sections. In a variation of this arrangement, the rings in the center section may also vary in thickness and axial length.

In another embodiment, the enclosure may be comprised of a plurality of uniformly or non-uniformly sized rings with different layering arrangements along the axial length of the enclosure.

Different zones or layers can be made separately, then assembled or bonded together, but the rings can also be made co-wound with the core layers if they are filament/tow wound.

Accordingly, in one exemplary embodiment, the invention relates to an enclosure for a rotor in a generator including the rotor, rotor windings and a stator, the enclosure comprising a plurality of composite rings located adjacent one another along a length dimension of the rotor so as to contain the rotor windings on the rotor, the rings each comprising at least two layers selected from the group consisting essentially of metals, glass fibers and graphite fiber laminates.

In another aspect, the invention relates to an enclosure for a rotor in a generator including the rotor, rotor windings and a stator, the enclosure comprising a plurality of composite rings located adjacent one another along a length dimension of the rotor so as to contain the rotor windings on the rotor, the rings each comprising at least three layers selected from the group consisting essentially of metals, glass fibers and graphite fiber laminates; wherein the plurality of rings include a plurality of axially shorter rings located between a pair of axially longer rings; and further wherein the axially shorter rings vary in diameter in opposite directions toward a center ring of smallest diameter, and have different compositions than the axially longer rings.

In still another aspect, the invention relates to an enclosure for a rotor in a generator including the rotor, rotor windings and a stator, the enclosure comprising a plurality of composite rings located adjacent one another along a length dimension of the rotor so as to contain the rotor windings on the rotor, the rings each comprising two layers including a radially inner metal layer and a radial outer layer of graphite fiber laminates; wherein the plurality of rings include a plurality of axially shorter rings located between a pair of axially longer rings, the axially shorter rings decreasing in diameter in opposite directions towards a center ring of smallest diameter.

BRIEF DESCRIPTION OF THE DRAWINGS

FIG. 4 is a partial cross-section through a plurality of enclosure rings in accordance with still another exemplary embodiment of the invention;

FIG. 5 is a partial cross-section through a plurality of enclosure rings illustrating various other possible combination of layers of material for the enclosure rings.

DETAILED DESCRIPTION OF THE INVENTION

Figure 1:
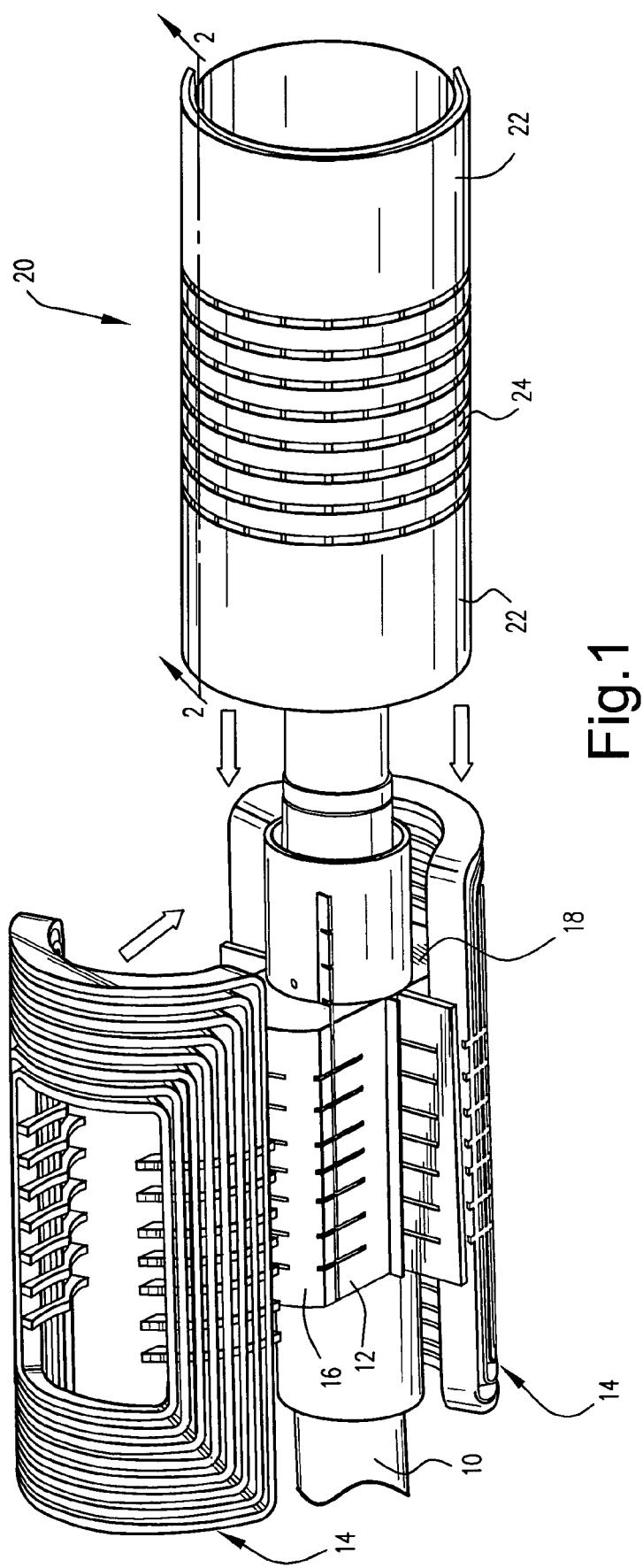
FIG. 1 is an exploded perspective view of a winding assembly and generator rotor along with an enclosure formed by a plurality of uniform diameter enclosure rings.

With reference to FIG. 1, a generator rotor 10 includes a multi-pole magnetic core 12 (two-pole core shown) and a plurality of winding assemblies 14, assembled over the respective poles 16, 18. The construction of the magnetic core 12 and winding assemblies 14 is known, and details thereof need not be further provided.

After the winding assemblies 14 are assembled over the parallel sided forging of the two-pole magnetic core 12, an enclosure 20 is telescoped over the assembly.

Figure 2:
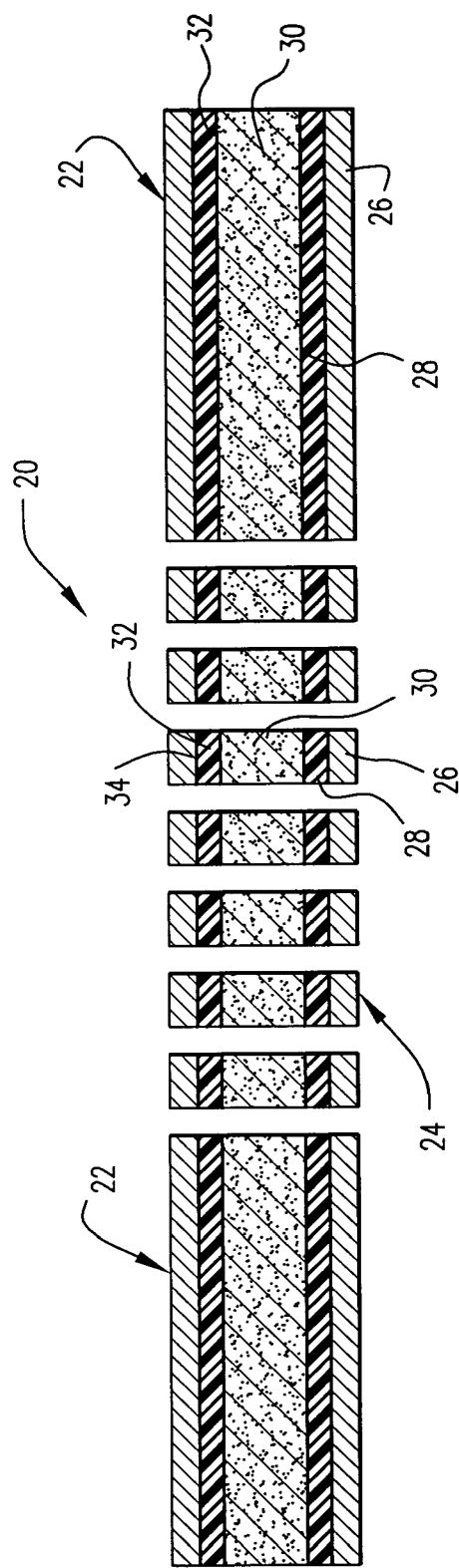
FIG. 2 is a partial cross-section taken along the line 2—2 of FIG. 1.

In the embodiment shown in FIGS. 1 and 2, the enclosure 20 is a tubular structure made up of a plurality of discrete rings. In the exemplary embodiment shown, rings of uniform diameter but of two different axial lengths are employed. Relatively longer rings 22 are arranged at opposite ends of the enclosure 20, with a plurality of shorter rings 24 located axially between the rings 22. Generally, the rings are multi-layered composites, with as few as two and as many as five discrete layers selected from a group including metals, glass fiber laminates and graphite (carbon) fiber laminates. The metal layer or layers may be composed of an electrically conductive metal such as aluminum. For purposes of this disclosure, the term intermediate layer or radially intermediate refers to any layer that is not a radially innermost or outermost layer.

FIG. 2 illustrates the composition of the rings 22, 24. Each of the rings in this exemplary embodiment is formed with five layers. More specifically, the radially innermost layer 26 is composed of a metal material. Adjacent the metal layer 26 is a glass fiber laminate layer 28. The middle or core intermediate layer 30 is comprised of graphite (carbon) fiber laminates. The radially outer layers include a glass fiber laminate layer 32, adjacent the middle layer, and a radially outermost metal layer 34. Thus, the middle layer 30 serves as a core zone that insulates the outer layers 32, 34 from the inner layers 26, 28 and provides the majority of circumferential, or hoop, strength and stiffness. This same layered composition is utilized in each of the rings 22, 24 along the length of the enclosure 18.

Figure 3:
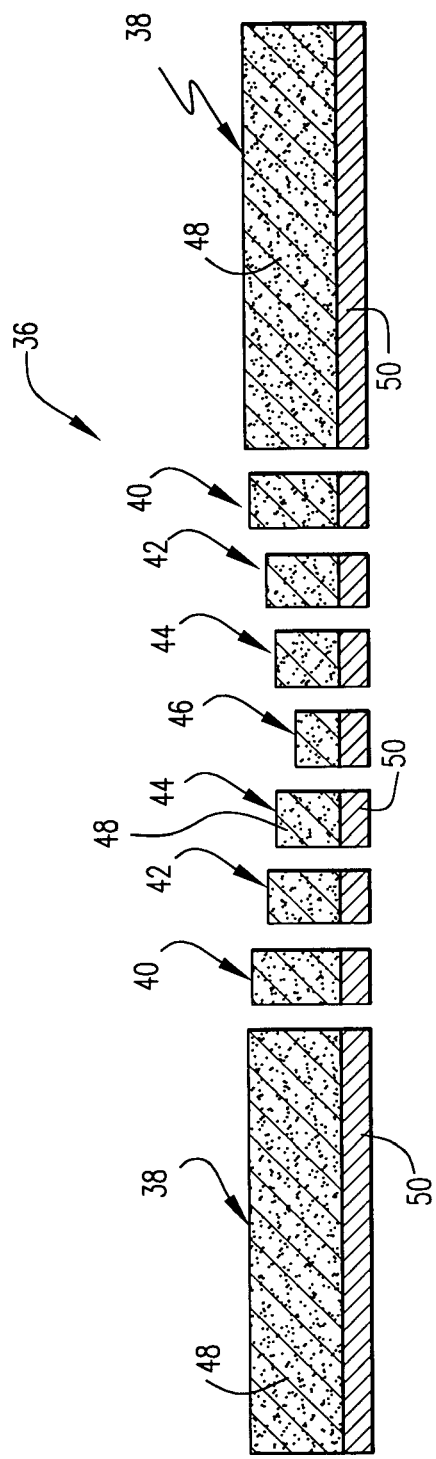
FIG. 3 is a partial cross-section through an enclosure formed by a plurality of non-uniform diameter and/or axial length rings with different compositions along the length of the enclosure in accordance with another exemplary embodiment of the invention.

In another exemplary embodiment illustrated in FIG. 3, the enclosure 36 is also comprised of a pair of axially longer rings 38 located on either side of a centrally located plurality of axially shorter rings 40, 42, 44 that decrease in diameter in uniform fashion toward the smallest diameter center ring 46. In this arrangement, the rings are of two-layered construction where the radially outer layer 48 of each ring is comprised of the graphite (carbon) fiber laminates and the radially inner layer 50 is comprised of metal.

FIG. 4 illustrates yet another enclosure 52 that is similar in outward appearance to that shown in FIG. 3, but here, the composition of the longer rings 54 at the respective opposite ends of the enclosure 52 differs from the composition of the shorter rings 56, 58, 60 and 62 in the center portion of the enclosure, respectively. More specifically, the two outer or end rings 54 are each comprised of a radially outer layer 64 of graphite (carbon) fiber laminates, an intermediate glass fiber laminate layer 66, and a radially inner metal layer 68. The shorter rings 56–62 in the center portion of the enclosure each include radially inner and outer glass fiber laminate layers 70, 72 sandwiched about an intermediate layer 74 of graphite (carbon) fiber laminates.

Figure 6:
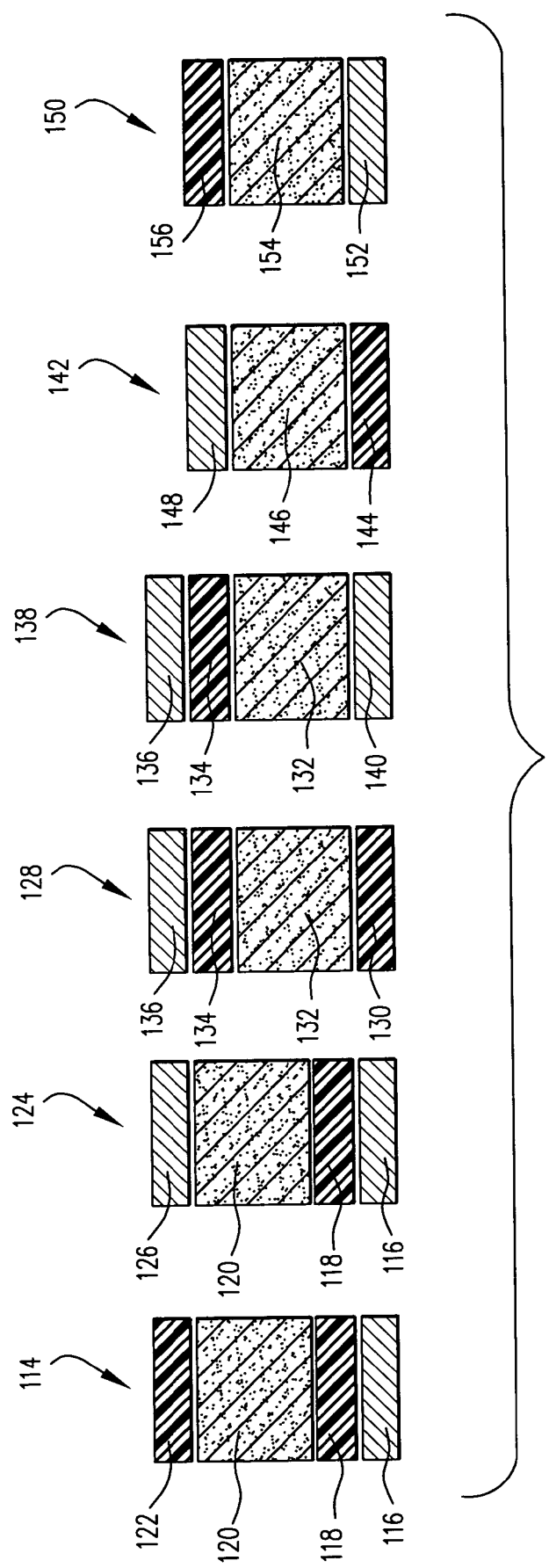
FIG. 6 is similar to FIG. 5 but illustrating still other possible layering arrangements for the enclosure rings.

FIG. 5 illustrates a plurality of enclosure rings of varying composition and diameter, and is merely intended to illustrate the wide variety of combinations of layers that may make up the individual, discrete rings of the enclosure, i.e., FIG. 6 does not show the rings of a single enclosure. Typically, the compositions and diameters would differ only between the end or outside rings and the rings in the center portion of the enclosure as shown in FIGS. 2–4. From left to right, in FIG. 5, the ring 76 is comprised of an intermediate layer 78 of graphite (carbon) fiber laminates while both the radially inner and outer layers 80 and 82 are metal layers.

The ring 84 is a two layer construction including a radially inner layer 86 of graphite (carbon) fiber laminates and a radially outer metal layer 88.

Ring 90 is a three layer construction that includes a radially inner layer 92 of graphite (carbon) fiber laminates, an intermediate glass fiber laminate layer 94, and a radially outer metal layer 96.

Ring 98 is a three layer construction that includes a radially inner glass fiber layer 100, an intermediate layer 102 of graphite (carbon) fiber laminates, and an outer glass fiber laminate layer 104.

Ring 106 is a two layer construction that includes a radially inner glass fiber laminate layer 108 and a radially outer layer 110 of graphite (carbon) fiber laminates.

Ring 111 is a two layer construction that includes a radially inner layer 112 of graphite (carbon) fiber laminates and a radially outer glass fiber laminate layer 113.

Still other possible ring compositions are shown in FIG. 6. Ring 114 is a four layer construction that includes a radially inner metal layer 116, a glass fiber laminate layer 118, a layer of graphite (carbon) fiber laminates 120, and a radially outer glass fiber laminate layer 122.

Ring 124 is a four layer construction similar to ring 114 with the exception that the radially outer glass fiber laminate layer 122 has been replaced by a metal layer 126.

Ring 128 is also of four layer construction with a radially inner glass fiber laminate layer 130, a radially adjacent graphite (carbon) fiber laminate layer 132, another glass fiber layer 134, and a radially outer metal layer 136.

Ring 138 is a construction similar to ring 128 with the exception that the radially inner glass fiber laminate layer 130 has been replaced by a metal layer 140.

Ring 142 is a three layer construction including a radially inner glass fiber laminate layer 144, an intermediate layer 146 of graphite (carbon) fiber laminates and a radially outer metal layer 148.

Ring 150 is also a three layer construction similar to ring 142 but wherein the radially inner and outer layers have been reversed so that ring 150 includes a radially inner metal layer 152, an intermediate layer 154 of graphite (carbon) fiber laminates and a radially outer glass fiber laminate layer 156.

For most applications, the discrete ring compositions for a given enclosure will be uniform throughout but as already noted in connection with FIG. 4, the compositions of the shorter rings in the middle portion of the enclosure may differ from the longer rings at opposite ends of the enclosure. Nevertheless, there are many combinations of the three essential layer types that may be utilized as described above in connection with FIGS. 5 and 6.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An enclosure for a rotor in a generator including the rotor, and rotor windings, the enclosure comprising a plurality of composite rings located adjacent one another along a length dimension of the rotor so as to contain the rotor windings on the rotor, said rings each consisting of a first radially innermost metal layer, a second adjacent glass fiber laminate layer, a third layer of graphite fiber laminates radially outward of said second layer, and a fourth radially outermost glass fiber laminate layer.

2. An enclosure for a rotor according to claim 1, wherein the rings are spaced at predetermined intervals.

3. An enclosure for a rotor according to claim 2, wherein the rings are spaced axially.

4. The enclosure of claim 1 wherein said plurality of composite rings includes at least one axially shorter ring between a pair of axially longer rings.

5. The enclosure of claim 4 wherein said at least one axially shorter ring comprises a plurality of axially shorter rings varying in diameter in opposite directions toward a center ring of smallest diameter.

6. An enclosure for a rotor in a generator including the rotor and rotor windings, the enclosure comprising a plurality of composite rings located adjacent one another along a length dimension of the rotor so as to contain the rotor windings on the rotor, said rings each comprising at least two layers selected from the group consisting essentially of metals, glass fiber laminates and graphite fiber laminates;
wherein said plurality of rings include a plurality of axially shorter rings located between a pair of axially longer rings; and
wherein a radially outer layer comprises a glass fiber laminate layer and a radially inner layer comprises metal, and wherein said axially shorter rings vary in diameter in opposite directions toward a center ring of smallest diameter.

7. The enclosure of claim 6 wherein for at least some of said plurality of composite rings, said at least two layers comprises at least three layers, and wherein a radially intermediate layer comprises a second glass fiber laminate layer.

8. An enclosure for a rotor in a generator including the rotor, and rotor windings, the enclosure comprising a plurality of composite rings located adjacent one another along a length dimension of the rotor so as to contain the rotor windings on the rotor, said rings each comprising at least three layers selected from the group consisting essentially of metals, glass fiber laminates and graphite fiber laminates; wherein said plurality of rings include a plurality of axially shorter rings located between a pair of axially longer rings; and further wherein said axially shorter rings vary in diameter in opposite directions toward a center ring of smallest diameter, and have different compositions than said axially longer rings.

9. The enclosure of claim 8 wherein each of said longer rings comprises a radially inner metal layer, an intermediate glass fiber laminate layer and a radially outer glass fiber laminate layer.

10. The enclosure of claim 9 wherein each of said axially shorter rings comprises radially inner and outer glass fiber laminate layers and an intermediate layer of graphite fiber laminates.

11. The enclosure of claim 9 and further comprising a graphite fiber laminate layer between said intermediate glass fiber laminate layer and said radially outer glass fiber laminate layer.

12. An enclosure for a rotor in a generator including the rotor, and rotor windings, the enclosure comprising a plurality of composite rings located adjacent one another along a length dimension of the rotor so as to contain the rotor windings on the rotor, said rings each comprising two layers including a radially inner metal layer and a radial outer layer of graphite fiber laminates; wherein said plurality of rings include a plurality of axially shorter rings located between a pair of axially longer rings, said axially shorter rings decreasing in diameter in opposite directions towards a center ring of smallest diameter.

13. An enclosure for a rotor in a generator including the rotor and rotor windings, the enclosure comprising a plurality of composite rings located adjacent one another along a length dimension of the rotor so as to contain the rotor windings on the rotor, said rings each comprising a multilayer composite, wherein said composite rings vary in length, and
wherein compositions of at least two adjacent ones of said plurality of composite rings vary.

14. The enclosure of claim 13 wherein said plurality of composite rings includes at least one axially shorter ring between a pair of axially longer rings.

15. The enclosure of claim 14 wherein said at least one axially shorter ring comprises a plurality of axially shorter rings varying in diameter in opposite directions toward a center ring of smallest diameter.

16. The enclosure of claim 13 wherein said multilayer composite comprises discrete layers selected from the group consisting of metals, glass fiber laminates, and graphite fiber laminates.

* * * * *